3,427,475
HIGH SPEED COMMUTATING SYSTEM FOR LOW
LEVEL ANALOG SIGNALS
Bruce L. Wilkinson, Torrance, and Paul W. Le Vier, Pasadena, Calif., assignors to the United States of America as represented by the United States Atomic Energy Commission
Filed Nov. 5, 1965, Ser. No. 506,915
U.S. Cl. 307—243                         4 Claims
Int. Cl. H03k 17/04

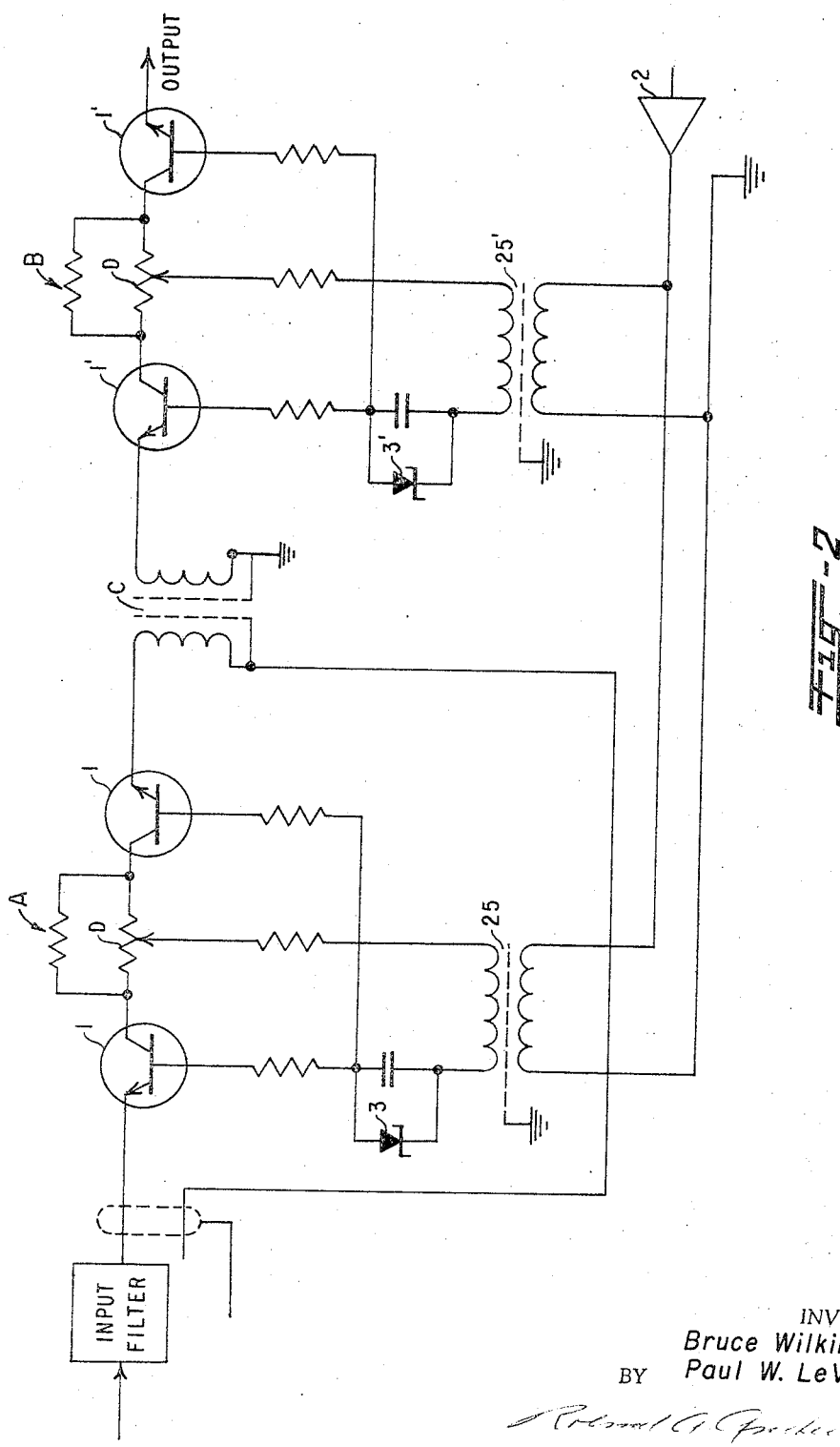

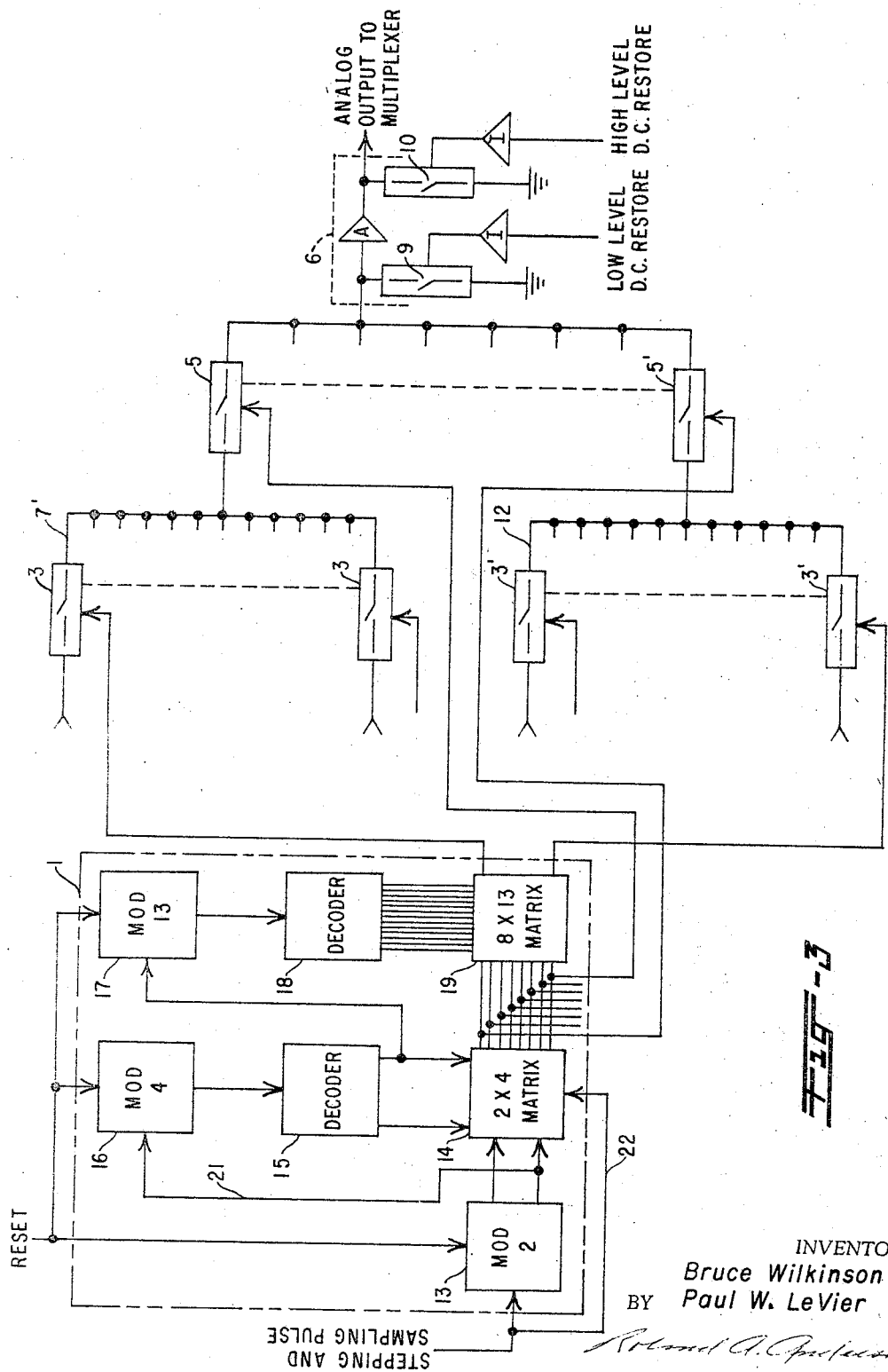

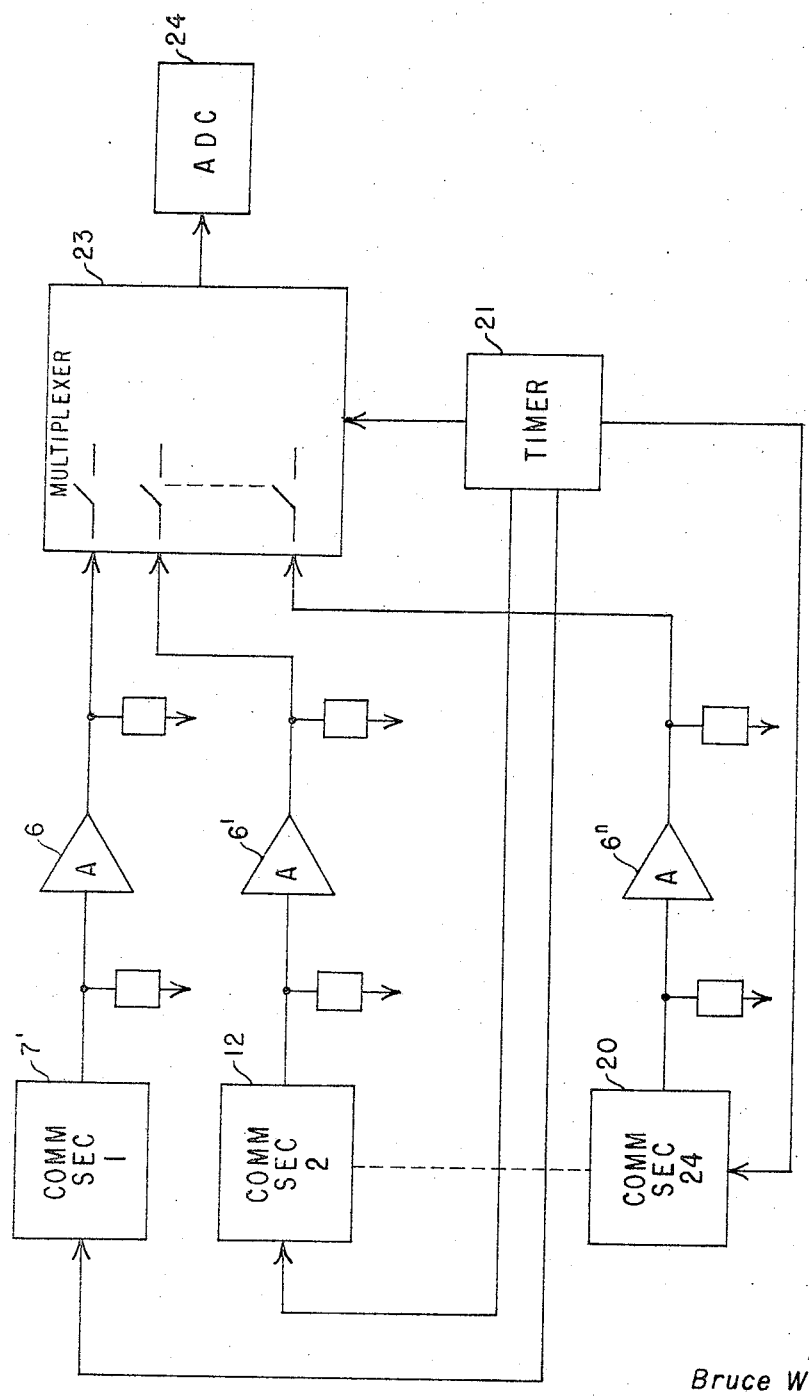

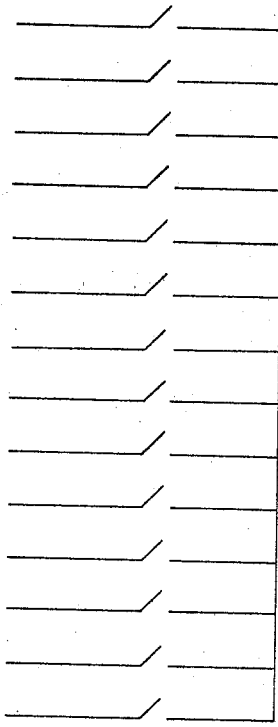
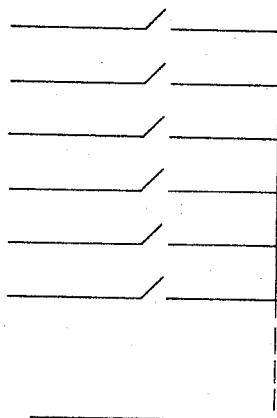
Fig-6

ABSTRACT OF THE DISCLOSURE

A solid state switching system has been provided which solves the problems of commutating a large number of low level analog signals at a high rate of speed. Analog signals indicative of temperature, pressure, flow rate, radioactivity, humidity, etc., in an operating reactor, for example, are monitored sequentially by means of high speed solid state circuitry passed and transformer amplified in a manner to eliminate background noise from the signals. The switching sequence is controlled by a logic address system which operates the various solid state switches to transmit the analog signals in time sequence to a single output line in a very short period of time.

---

The invention described herein was made in the course of, or under, a contract with the U.S. Atomic Energy Commission.

This invention relates to switching arrangements, and more particularly to a series of solid state switches arranged to form a high speed commutator.

In modern systems, it is necessary to monitor a great many devices to determine existing conditions and to detect changes that are taking place. These conditions may involve temperature, pressure, flow, radioactivity, humidity, or the operativeness of or load on portions of the system. To make the many determinations required, it may be desirable to scan or periodically sample analog signals from a large number of sources at a very high rate in order to avoid the necessity of using a large number of parallel, continuous channels with all of the complexities, duplication of components and additional maintenance that these requirements would involve.

The need for a rapid scanning system is particularly great in the control systems of large power reactors where it is necessary to examine the coolant from the various fuel elements at least every 0.1 second to detect any abnormal condition that might exist at some critical point in the reactor.

Applicants with a knowledge of these problems have for an object of their invention the provision of a high speed solid state commutator for selectively passing and amplifying low level analog signals from a voltage source or sources.

Applicants have as another object of their invention the provision of a high speed solid state commutator for selecting and sequentially passing pulses while rejecting common mode and other noise signals present in process environments.

Applicants have as a further object of their invention the provision of a high speed solid state commutator which minimizes dead time by selecting and simultaneously processing a plurality of pulses to reduce their pulse length by eliminating portions thereof containing undesired noise signals and arranging the pulses in proper sequence for measurement and evaluation.

Applicants have as a still further object of their invention the combination of a large number of sections or units of a solid state commutator through a multiplexer to provide high speed selection and transmittal of a large number of signals and the removal of superimposed noise signals therefrom with a minimum of dead time.

Other objects and advantages of our invention will appear from the following specification and accompanying drawings, and the novel features thereof will be particularly pointed out in the annexed claims.

Figure 1:
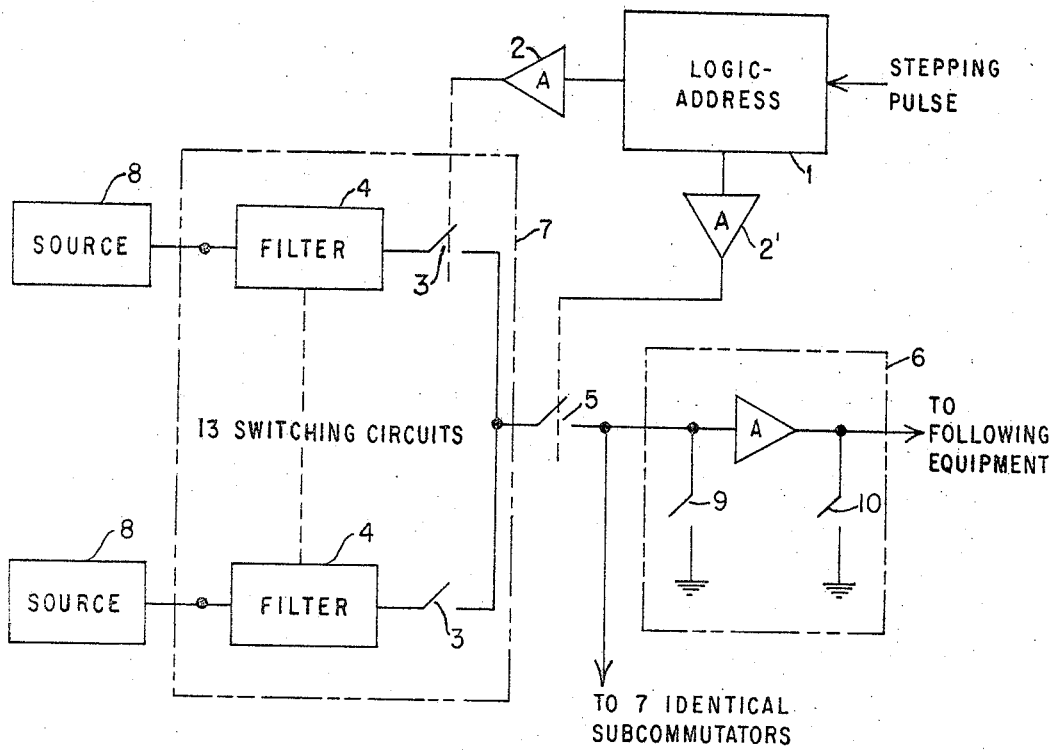
Figure 4:
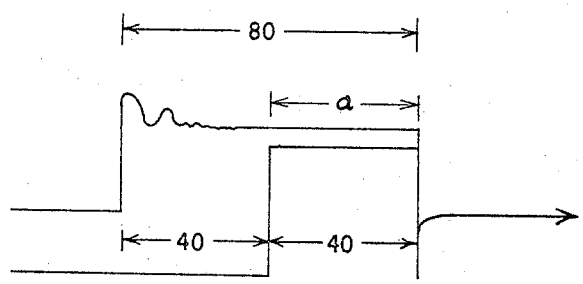

In the drawings, FIG. 1 is a block diagram of a unit of our improved solid state commutator. FIG. 2 is a circuit diagram of our improved solid state switch used in the individual channels of the solid state commutator. FIG. 3 is a block diagram of two groups of thirteen channel used in our improved solid state commutator. FIG. 4 is a schematic of the waveform of the signal passed by each channel and commutated by the sub-commutator. FIG. 5 is a block diagram of a series of solid state commutator units which feed a multiplexer. FIG. 6 is a schematic of the commutator indicating the sequence of switch operation.

Referring to the drawings in detail, the schematic of FIG. 1 shows one group of thirteen switching circuits or channels enclosed in dotted lines in block 7. The components of the upper and lower channels of the group are shown and include filters 4 and solid state commutator switches 3. All thirteen channels are identical.

Analog voltage signals from suitable signal sources 8, such as thermocouples (not shown) are fed to the inputs of the filters 4. The filters are employed to minimize noise by rejecting signals above a low frequency. They preferably comprise two conventional RC filter sections to exclude noise above about 3½ cycles/second. Due to this cutoff, the filter 4 limits the frequency response of the circuit, and serves to block high frequency differential voltages at the filters.

The filtered analog data is then applied to the input terminals of the solid state switch 3. Block 1, labeled "Logic Address," is a group of logic circuits, such as a simple counter circuit, which develops the necessary addresses to activate, in proper sequence, the switch drivers or power amplifiers 2. These logic circuits make the commutator a separate unit capable of operating without the requirements of a separate program control device, and provide 104 separate output leads which are energized in sequence, each connected to a driver circuit 2. The 104 switch drivers 2 deliver amplified energizing current pulses to the solid state commutator switches in sequence in response to signals from respective outputs of the Logic Address 1, commanding each switch in turn to close for 80 μsec.

As shown in FIG. 2, and described in the copending application of Wilkinson et al., S.N. 539,180, filed Feb. 15, 1966, this switch comprises two separate solid state switching elements A, B, coupled through a double-shielded step-up transformer C with a very low leakage and capacitance factor, and having a 1 to 2 turn ratio to provide voltage amplification. With proper shielding, common mode rejection ratios of 1,000,000 to 1 or more are attained. By means of integrated offset compensation networks this switch can deliver a minimum sensitivity in the range of 3 microvolts or less. Each switching element A, B is of the general type disclosed in the patent to Shockley, 2,891,171. The impedances of the transistors of each switching element are matched with potentiometer D so as to permit offset tracking of better than .01 percent accuracy. The switching elements A, B forming a switch 3 (FIG. 1) are coupled in parallel through transformers 25, 25' to switch driver 2. By successively closing the switches 3 in each switching circuit, a pulse amplitude modulated signal is applied to the common sub-commutator switch 5 of FIG. 1. Since the signal at the input of each commutator switch 3 is an analog signal, the effect of each closing and opening of the switch is to change a steady or varying voltage at the input of filter 4 into a voltage pulse. Sub-commutator switch 5 is a single transistor switch such as element A or B, using back-to-back connected transistors. It does not require a coupling transformer.

Sub-commutator switches 5 are successively closed in response to clock pulses from a timer or address logic 1 applied through switch driver 2′. One of the thirteen switches 3 in each group is closed at the same time as its corresponding switch 5.

The outputs of these thirteen switching groups 7 are connected through the sub-commutator switches 5 to a low level-high gain amplifier 6 which is described in the copending application of Wayne K. Hodder, S.N. 495,488 filed May 27, 1965. The low level amplifier 6 has an input clamp 9 and an output clamp 10 to eliminate the necessity for a D.C. amplifier with its attendant drift.

Now referring to FIG. 3, the logic address 1 is shown in dotted lines along with two groups of switching circuits 7′, 12, each having thirteen switching circuits. The logic address is a conventional timing pulse generator and includes a series of counters 13, 16, 17, decoders 15, 18, and matrices 14, 19. Timing pulses for the 104 switches 3 are derived from an 8 x 13 matrix 19 which produces an 80 $\mu$sec. pulse on each output lead in sequence. Inputs for the matrix are thirteen leads from a decoder 18 connected to a modulo 13 counter 17, and eight leads from a 2 x 4 matrix 14. All of these devices are conventional. Only one of the groups of eight inputs and one of the groups of thirteen inputs will be active at the same time, thereby selecting at their intersection the output lead to be energized. In like manner, 2 x 4 matrix 14 produces an 80 $\mu$sec. pulse on each of its eight output leads in sequence. Inputs are two leads receiving opposite-phase pulses from counter 13, leads receiving the four outputs of decoder 15 for counter 16 and lead 22 which activates the selected matrix output for 80 $\mu$sec., the width of the sampling pulse.

The eight lines, from the 2 x 4 matrix 14, that feed the 8 x 13 matrix 19 also drive the sub-commutator switches 5. The modulo 13 counter 17 and its decoder 18 provide signals that are synchronized with the eight output lines from the 2 x 4 matrix 14, but change from one state to the next only ⅛ as often. If one designates the thirteen input lines to the 8 x 13 matrix 19 as $1_{13}$, $2_{13}$, $3_{13}$, $4_{13}$ ... $13_{13}$, and the eight input lines to the 8 x 13 matrix 19 as $1_8$, $2_8$, $3_8$ ... $8_8$, as generally indicated in FIG. 6, the sequence is as shown in Table I.

original states. A reset pulse is sent at that time, but if the counters are operating correctly, they are already reset.

During the switching operation of commutator switches 3, 3′ of FIG. 3, a transient voltage is developed. The closure of a solid state switch with transformer coupling, such as that shown in FIG. 2, produces a ringing voltage that is related to the leakage inductance in the coupling transformer. FIG. 4 depicts the waveform timing involved in the solid state commutator switch 3. The wave is 80 $\mu$sec. wide and the first part, approximately 30 $\mu$sec. includes the noise referred to above, and shown as a series of superimposed waves on the pulse system where the commutator may be used. To minimize its effects, only the portion of the pulse free of this noise, i.e., the last 40 $\mu$sec. will be used in the system to which the commutator is connected, thus cutting off the first part of the signal at the point $a$ of FIG. 4.

The purpose in splitting the commutator internally into 8 groups of thirteen switches was to reduce the effect of the leakage current from the "off" switches. The transistors in switches 3 were selected to have a reverse leakage current less than $10^{-9}$ amperes, but if 104 of them were connected in parallel, the leakage current could be as high as $103 \times 10^{-9}$ amperes. Thus, the switches were subdivided to reduce this leakage current. As better transistors become available, this will not be necessary.

FIG. 5 shows how twenty-four of the identical commutator sections or units may be assembled to pass 24,960 pulses per second. Each of the 24 sections 7′, 12–20 comprises eight groups of thirteen switching circuits each or 104 channels. These sections feed a multiplexer 23, each being joined to a separate conventional multiplexer switch. The sequential closing of the multiplexer to selectively couple the commutator sections to the common output of the multiplexer is under the control of timing pulses from a clock or timer 21. This timer closes each multiplexer switch in sequence to pass the last 40 $\mu$sec. of each input pulse from the commutator sections. The timer 21 also acts through counter 13 to supply timing signals of 80 $\mu$sec. duration to the commutator switches of each section as described above in connection with FIG. 3. The output of the multiplexer may drive any suitable component such as an analog-digital converter 24.

From the foregoing, it will be apparent that the multiplexer switches 23 of FIG. 4 are driven by 40 $\mu$sec. wide pulses synchronized in timer 21 with the 80 $\mu$sec. wide commutator pulses such that the multiplexer passes only the last 40 $\mu$sec. of the pulses from the commutator, and suppresses the noise.

TABLE I

| (1) | (2) | (3) | (4) | (5) | (6) | (7) | (8) | (9) | (10) | (11) | (12) | (13) | (14) | (15) | (16) | (17) | (18) | (19) | (20) | (21) | (22) |
|---|---|---|---|---|---|---|---|---|---|---|---|---|---|---|---|---|---|---|---|---|---|
| $1_{13}$ | $1_{13}$ | $1_{13}$ | $1_{13}$ | $1_{13}$ | $1_{13}$ | $1_{13}$ | $1_{13}$ | $2_{13}$ | $2_{13}$ | $2_{13}$ | $2_{13}$ | $2_{13}$ | $2_{13}$ | $2_{13}$ | $2_{13}$ | $3_{13}$ | $3_{13}$ | $3_{13}$ | $3_{13}$ | etc. | |
| $1_8$ | $2_8$ | $3_8$ | $4_8$ | $5_8$ | $6_8$ | $7_8$ | $8_8$ | $1_8$ | $2_8$ | $3_8$ | $4_8$ | $5_8$ | $6_8$ | $7_8$ | $8_8$ | $1_8$ | $2_8$ | $3_8$ | $4_8$ | | |

TABLE I

The numbers in parentheses indicate the numerical sequence of events, while the other two numbers in each box indicate which of the input lines to the 8 x 13 matrix are energized. Thus it is seen that the sub-commutator switches 5 are successively closed, rather than the switches 3. Another way of illustrating this is shown in FIG. 6 where the numbers have the same significance as before. It can be seen that the first input to be sampled in the commutator is switch $1_{13}$, $1_8$ and the second input to be sampled is $1_{13}$, $2_8$, which is the first switch in the second group of 13. All operations are determined by the states of the counters, and since the counters have exactly the correct number of states for the application, the commutator runs synchronously. There are 104 switches to be addressed, and after 105 stepping pulses have been received by the commutator, the counters are back in their

Having thus described our invention, we claim:

1. A low noise level-high speed solid state commutator comprising a series of parallel signal channels, a solid state commutator switch in each channel, said switch comprising two semiconductor switching elements coupled by a step-up transformer, a sub-commutator switch joined to a preselected group of the signal channels, a timer coupled to the commutator switches and the sub-commutator switch for supplying timing pulses thereto for sequentially closing the commutator switches to pass signals of predetermined width, and for supplying a pulse to close the sub-commutator switch when each commutator switch is closed.

2. A low noise level-high speed solid state commutator comprising a series of parallel signal channels, a solid state commutator switch in each channel, said switch comprising two transistor switching elements coupled together by a step-up transformer having a turns ratio of 1 to 2, each of said switching elements including a pair of back-to-back connected transistors, a subcommutator switch joined to a group of the signal channels, a timer coupled to the commutator switches and the sub-commutator switch for supplying timing pulses thereto for sequentially closing the commutator switches to pass signals of predetermined width, and for periodically supplying a pulse to close the sub-commutator switch simultaneously with the closing of each commutator switch.

3. A low noise level-high speed solid state commutator comprising a series of parallel signal channels, a solid state commutator switch in each channel, said switch comprising two transistor switching elements coupled together by a step-up transformer having a turns ratio of 1 to 2, each of said switching elements including a pair of back-to-back connected transistors, a subcommutator solid state switch including a pair of back-to-back connected transistors joined to a group of the signal channels, a timer coupled to the commutator switches and sub-commutator switch for supplying timing pulses thereto for sequentially closing the commutator switches to pass signals of predetermined width, and for supplying a pulse to the sub-commutator switch to close it when each commutator switch is closed.

4. A low noise level-high speed solid state commutator comprising a first and a second group of parallel signal channels, a commutator switch in each of said channels for forming and passing pulses of predetermined width, said commutator switch comprising a primary switch including a pair of series connected transistors, a secondary switch including a pair of series connected transistors, a shielded step-up transformer having its primary side connected to the output of said primary switch and its secondary side connected to the input of said secondary switch for amplifying pulses applied thereto through said primary switch, a solid state sub-commutator switch for each said group, each sub-commutator switch having its input connected to the output of the channels in a group to join them together in parallel relation, a timer coupled to the commutator switches of said first and said second groups to feed timing signals to the commutator switches of alternate groups to produce sequential closing of the commutator switches in said first and said second groups, and to provide signals to close the sub-commutator switches in sequence for passing the channel pulses from the first and second groups.

References Cited
UNITED STATES PATENTS

| 2,666,868 | 1/1954 | McMillan. | |
|---|---|---|---|
| 2,863,139 | 12/1958 | Michelson. | |
| 2,955,254 | 10/1960 | Audretsch et al. | |
| 3,021,430 | 2/1962 | Lynch. | |
| 3,052,759 | 9/1962 | Turner. | |
| 3,059,228 | 10/1962 | Beck et al. | 179—15 X |
| 3,086,125 | 4/1963 | Gumin et al. | 307—254 X |
| 3,089,963 | 5/1963 | Djorup | 307—243 |
| 3,233,121 | 2/1966 | Chou | 307—243 |

ARTHUR GAUSS, *Primary Examiner.*

DONALD D. FORRER, *Assistant Examiner.*

U.S. Cl. X.R.

307—253; 328—104, 154; 179—15